(12) United States Patent
Narang et al.

(10) Patent No.: US 11,651,223 B2
(45) Date of Patent: May 16, 2023

(54) SYSTEMS AND METHODS FOR BLOCK-SPARSE RECURRENT NEURAL NETWORKS

(71) Applicant: Baidu USA, LLC, Sunnyvale, CA (US)

(72) Inventors: Sharan Narang, Sunnyvale, CA (US); Eric Undersander, San Francisco, CA (US); Gregory Diamos, San Jose, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1134 days.

(21) Appl. No.: 16/151,886

(22) Filed: Oct. 4, 2018

(65) Prior Publication Data

US 2019/0130271 A1 May 2, 2019

Related U.S. Application Data

(60) Provisional application No. 62/577,942, filed on Oct. 27, 2017.

(51) Int. Cl.
*G06N 3/08* (2006.01)
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC ................................. G06N 3/082; G06N 3/04
(Continued)

(56) References Cited

U.S. PATENT DOCUMENTS

2010/0312735 A1 12/2010 Knoblauch
2011/0218950 A1* 9/2011 Mirowski ............ G06N 3/0454
706/12
(Continued)

FOREIGN PATENT DOCUMENTS

CN 105513591 A 4/2016
CN 106355248 A 1/2017
(Continued)

OTHER PUBLICATIONS

Srinvas et al., "Data-free Parameter Pruning for Deep Neural Networks", arXiv:1507.06149v1 [cs.CV] Jul. 24, 2015 (Year: 2015).*
(Continued)

*Primary Examiner* — Tsu-Chang Lee
(74) *Attorney, Agent, or Firm* — North & Weber & Baugh LLP

(57) ABSTRACT

Described herein are systems and methods to prune deep neural network models in reducing the overall memory and compute requirements of these models. It is demonstrated that using block pruning and group lasso combined with pruning during training, block-sparse recurrent neural networks (RNNs) may be built as accurate as dense baseline models. Two different approaches are disclosed to induce block sparsity in neural network models: pruning blocks of weights in a layer and using group lasso regularization to create blocks of weights with zeros. Using these techniques, it is demonstrated that block-sparse RNNs with high sparsity can be created with small loss in accuracy. Block-sparse RNNs eliminate overheads related to data storage and irregular memory accesses while increasing hardware efficiency compared to unstructured sparsity.

20 Claims, 13 Drawing Sheets

(58) Field of Classification Search
USPC .......................................................... 706/25
See application file for complete search history.

(56) References Cited

U.S. PATENT DOCUMENTS

| | | | |
|---|---|---|---|
| 2016/0358070 A1 | 12/2016 | Brothers et al. | |
| 2017/0046614 A1 | 2/2017 | Golovashkin et al. | |
| 2017/0103300 A1 | 4/2017 | Henry et al. | |
| 2017/0228638 A1 | 8/2017 | Danihelka et al. | |
| 2018/0357302 A1* | 12/2018 | Qi | G06F 16/35 |
| 2019/0164538 A1* | 5/2019 | Seo | G10L 15/285 |
| 2020/0234137 A1* | 7/2020 | Chen | G06N 3/0454 |

FOREIGN PATENT DOCUMENTS

| | | |
|---|---|---|
| CN | 106779075 A | 5/2017 |
| CN | 107239825 A | 10/2017 |
| CN | 107247991 A | 10/2017 |
| CN | 107273899 A | 10/2017 |

OTHER PUBLICATIONS

Amodei et al.,"Deep speech 2: End-to-end speech recognition inenglish and Mandarin," In Proceedings of The 33rd International Conference on Machine Learning, 2016. (10pgs).

Cho et al.,"Learning phrase representations using rnn encoder-decoder for statisticalmachine translation," arXiv preprint arXiv:1406.1078, 2014. (15pgs).

Denil et al.,"Predicting parameters in deep learning," arXiv preprint arXiv:1306.0543, 2014. (8pgs).

Denton et al.,"Exploiting linear structure within convolutional networks for efficient evaluation," arXiv preprint arXiv:1404.0736, 2014. (11 pgs).

Fan et al.,"Convergence of batch gradient learning with smoothing regularization and adaptive momentum for neural networks," SpringerPlus, 5(1):295, 2016. (17pgs).

Faraone et al.,"Compressing low precision deep neural networks using sparsity-induced regularization in ternary networks," arXiv preprint arXiv:1709.06262, 2017. (10pgs).

Graves et al.,"Connectionist temporal classification:labelling unsegmented sequence data with recurrent neural networks," In Proceedings of the 23rd international conference on Machine learning, pp. 369-376. ACM, 2006. (8pgs).

Gupta et al.,"Deep learning with limited numerical precision," In Proceedings of the 32nd International Conference on Machine Learning (ICML-15), pp. 1737-1746, 2015. (10pgs).

Han et al.,"Deep compression: Compressing deep neural networks with pruning, trained quantization and huffman coding," arXiv preprint arXiv:1510.00149, 2016.(5 pgs).

Hanson et al.,"Comparing Biases for Minimal Network Construction With Back-Propagation," [online], [Retrieved Sep. 12, 2019]. Retrieved from Internet <URL: https://papers.nips.cc/paper/156-comparing-biases-for-minimal-network-construction-with-back-propagation.pdf>, 1989. (9pgs).

Hassibi et al.,"Optimal brain surgeon and general network pruning," In Neural Networks, 1993., IEEE International Conference on, pp. 293-299. IEEE, 1993. (7pgs).

Hochreiter et al.,"Long Short-Term Memory," [online], [Retrieved Sep. 12, 2019], Retrieved from Internet <URL: https://www.mitpressjournals.org/doi/10.1162/neco.1997.9.8.1735>. (2pgs).

Jouppi et al.,"In-Datacenter Performance Analysis of a Tensor Processing Unit," [online], [Retrieved Sep. 12, 2019], Retrieved from Internet <URL: https://arxiv.org/ftp/arxiv/papers/1704/1704.04760.pdf>. (17pgs).

Jozefowicz et al.,"Exploring the limits of language modeling," arXiv preprint arXiv:1602.02410, 2016. (11 pgs).

Kim et al.,"Tree-guided group lasso for multi-task regression with structured sparsity," In Proceedings of The 27th International Conference on Machine Learning, 2010.(8 pgs).

LeCun et al.,"Optimal Brain Damage," In NIPs, vol. 2, pp. 598-605, 1989. (8 pgs).

Yuan et al.,"Model selection and estimation in regression with grouped variables," [online], [Retrieved Sep. 12, 2019], Retrieved from Internet <URL: http://pages.stat.wisc.edu/~myuan/papers/glasso.final.pdf>, 2006. (19pgs).

Zhu et al.,"To prune, or not to prune: exploring the efficacy of pruning for model compression," arXiv preprint arXiv:1710.01878, 2017. (11 pgs).

Vanhoucke et al.,"Improving the speed of neural networks on CPUs," In Deep Learning & Unsupervised Feature Learning Workshop, NIPS 2011, 2011. (8 pgs).

Wen et al.,"Learning structured sparsity in deep neural networks," In Advances in Neural Information Processing Systems, 2016. (9 pgs).

Wen et al.,"Learning intrinsic sparse structures within long short-term memory," arXiv preprint arXiv:1709.05027, 2017. (11pgs).

Wu et al.,"Google's neural machine translation system: Bridging the gap between human and machine translation," arXiv preprint arXiv:1609.08144, 2016. (23pgs).

Yu et al.,"Exploiting sparseness in deep neural networks for large vocabulary speech recognition," In 2012 IEEE International Conference on Acoustics, Speech and Signal Processing (ICASSP), pp. 4409-4412. IEEE, 2012. (4pgs).

Yu et al.,"Scalpel:Customizing dnn pruning to the underlying hardware parallelism," In Proceedings of the 44th Annual International Symposium on Computer Architecture, pp. 548-560. ACM, 2017. (13pgs).

Liu et al,."Sparse convolutional neural networks," In Proceedings of the IEEE Conference on Computer Vision and Pattern Recognition, pp. 806-814, 2015. (9pgs).

Mao et al.,"Exploring the regularity of sparse structure in convolutional neural networks," arXiv preprint arXiv:1705.08922, 2017. (10 pgs).

Micikevicius & Narang et al.,"Mixed Precision Training," arXiv preprint arXiv:1710.03740, 2017. (14 pgs).

Narang et al.,"An update to DeepBench with a focus on deep learning inference," [online], [Retrieved Sep. 12, 2019], Retrieved from Internet <URL: https://svail.github.io/DeepBench-update/> 2017. (11 pgs).

Narang et al.,"Exploring sparsity in recurrent neural networks," arXiv preprint arXiv:1704.05119, 2017. (10pgs).

Nvidia, Nvidia Tesla V100 GPU Architecture. Technical report, 2017. [online], [Retrieved Sep. 12, 2019], Retrieved from Internet <URL: https://images.nvidia.com/content/volta-architecture/pdf/volta-architecture-whitepaper.pdf> (58 pgs).

Rastegari et al.,"XNOR-Net: ImageNet Classification Using Binary Convolutional Neural Networks," Springer International Publishing, Cham, 2016, [online], [Retrieved Sep. 12, 2019], Retrieved from Internet <URL: https://link.springer.com/chapter/10.1007%2F978-3-319-46493-0_32> (10pgs).

Chinese Office Action dated Nov. 29, 2022, in Chinese Application No. 201811266435.5A. (11 pgs).

Han et al.,"EIE: Efficient Inference Engine on Compressed Deep Neural Network," arXiv preprint arXiv: 1602.01528, 2016. (12pgs).

* cited by examiner

850

SYSTEMS AND METHODS FOR BLOCK-SPARSE RECURRENT NEURAL NETWORKS

CROSS-REFERENCE TO RELATED APPLICATION

This application claims the priority benefit under 35 USC § 119(e) to U.S. Prov. Pat. App. Ser. No. 62/577,942 (Docket No. 28888-2179P), filed on 27 Oct. 2017, entitled "BLOCK-SPARSE RECURRENT NEURAL NETWORKS", and listing Sharan Narang, Eric Undersander, and Gregory Diamos inventors. The aforementioned patent document is incorporated by reference herein in its entirety.

BACKGROUND

A. Technical Field

The present disclosure relates generally to systems and methods for computer learning that can provide improved computer performance, features, and uses.

B. Background

Recurrent Neural Networks (RNNs) are used in state-of-the-art models in domains such as speech recognition, machine translation, language modelling, etc. Sparsity is one technique to reduce compute and memory requirements of deep learning models. Sparse RNNs are easier to deploy on devices and high-end server processors. Even though sparse operations need less compute and memory relative to their dense counterparts, the speed-up observed by using sparse operations is less than expected on different hardware platforms. Sparse formats do not efficiently utilize the hardware resources due to storage overheads, irregular memory access, and inability to take advantage of array data-paths in modern processors.

Accordingly, what is needed are systems and methods for neural networks to added these issues to improve efficiencies of computing devices for machine learning.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
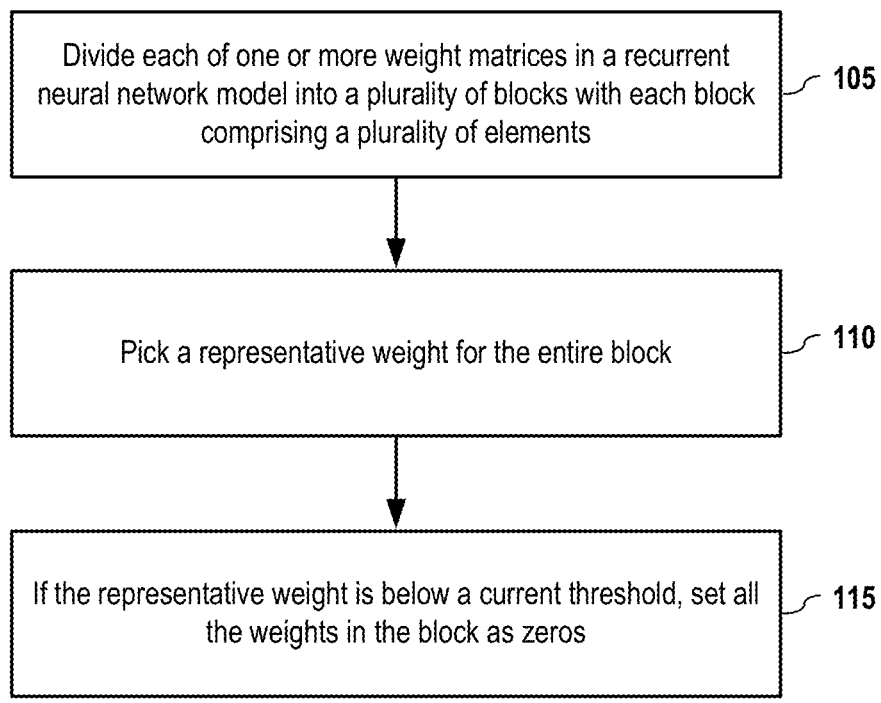
FIG. 1 depicts a process for block pruning for one or more matrices in a recurrent neural network, according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Improvements in several applications such as speech recognition, language modeling, and machine translation are a result of large Recurrent Neural Networks (RNNs) trained on large scale datasets. As the datasets available to train these models have grown, so have model sizes. Deployment of such large models is compute and memory intensive.

Pruning deep neural networks is an effective strategy to reduce the overall memory and compute requirements of these models. However, these approaches induce random, unstructured sparsity in the weight matrices. Speed-up obtained with random sparsity on various hardware platforms are lower than expected. Sparse formats do not efficiently utilize the hardware resources due to storage overheads, irregular memory access, and inability to take advantage of array data-paths in modern processors.

Block sparsity may address these issues. Saving indices of non-zero blocks instead of indices for non-zero elements reduces the storage overhead by a factor of block size. Block-sparse formats store blocks contiguously in memory reducing irregular memory accesses. Block sparsity inherently allows the advantage of array-data-path in modern processors.

In order to induce block sparsity in RNNs, a block pruning approach that zeros out blocks of weights in the matrix while the network is training is disclosed in this invention document. A block-sparse RNN is created after training. In addition to this pruning technique, the efficacy of group lasso regularization is examined to induce block sparsity in the network. In this invention document, group lasso regularization combined with block pruning is also disclosed.

In one or more embodiments, computer-implemented methods for computer learning (including but not limited to speech recognition, machine translation, language modeling, etc.) are provided. The methods may involve pruning a neural network model to reduce parameter numbers of the neural network model, thus reduce memory and computation requirements of the model for deployment. Specifically, at least one weight matrix of the neural network model is divided into a plurality of blocks with each block comprising a plurality of elements. For each block, a representative weight, e.g. the weight with maximum magnitude among the plurality of elements, is picked to represent an entire block. In response to the representative weight below a threshold, all the weights in the block are set to zeros.

This invention document demonstrated that block pruning and group lasso regularization with pruning are successful in creating block-sparse RNNs. Inducing block sparsity with 4×4 blocks in vanilla RNNs and Gated Recurrent Units (GRUs) results in 9% to 17% loss in accuracy compared to the dense baseline. Model size reduces by nearly 10×. In one or more embodiments, block sizes may be scaled up to 32×32. Larger blocks require lower sparsity to maintain similar accuracy. Accuracy loss may also be reduced by starting with a larger dense matrix than the baseline and then pruning it down while still reducing the number of parameters compared to the baseline.

The disclosed approach in this invention document is agnostic to the optimization algorithm and does not require any hyper-parameter retuning (besides pruning and regularization hyper-parameters). Furthermore, since this approach does not require re-training the model, training time remains the same.

B. Some Related Work

There have been several approaches to reduce the network size by pruning the model. Several bias techniques were used to decay weights in a network. Hessian-based approaches have been used to prune weights below a certain threshold. Simpler approaches like sorting or thresholding may be used to prune a neural network. Some use a hard threshold to prune deep learning models. Some prune recurrent neural networks using gradual pruning during the initial training run with a small accuracy loss. Unlike techniques disclosed in this invention document, all of the above approaches induce random, unstructured sparsity in neural networks.

Several approaches exist to induce structured sparsity in neural networks. A simple threshold based technique has been used to create structurally sparse CNNs. Some propose Scalpel that prunes CNNs taking into account the underlying target hardware architecture. The structure of Long Short Term Memory (LSTM) has also been altered in order to create LSTMs with smaller memory footprint. It was demonstrated that this technique works for language modeling on the Penn Tree Bank dataset. The disclosed approach in this invention document works with both vanilla RNN and GRU models trained on a large-scale datasets for speech recognition.

Group lasso regularization has been used as an efficient method for generating sparse structures. Group lasso regularization was used to induce structured sparsity in convolutional neural networks. Regularization is a known method to induce sparsity in deep neural networks. However, it appears that none of these approaches have been used with RNNs trained on large-scale datasets.

Other approaches to reduce compute and memory footprint for deep learning models include quantization and low-rank factorization. The disclosed approach in this invention document is orthogonal to these methods and therefore may be combined with them.

C. Embodiments of Implementation

It shall be noted that these experiments and results are provided by way of illustration and were performed under specific conditions using a specific embodiment or embodiments; accordingly, neither these experiments nor their results shall be used to limit the scope of the disclosure of the current patent document.

1. Embodiments of Block Pruning

Weight pruning algorithm has been explored to prune individual weights. Such a weight pruning algorithm introduces random, unstructured sparsity in RNNs, which may cause less computation efficiency, especially for parallel or vector computing. Furthermore, this pruning strategy does not impose any structure on the weights.

One the contrary, weight pruning approach to prune blocks of a matrix instead of individual weights is disclosed in this invention document. FIG. 1 depicts a process for block pruning for one or more matrices in a recurrent neural network, according to embodiments of the present document. The recurrent neural network may comprise one or more recurrent layers and one or more fully connected layers. In one or more embodiments, the one or more matrices may be used for determining linear and/or recurrent weights in one or more recurrent layers and weights in one or more fully connected layers. Each matrix is divided (105) into a plurality of blocks with each block comprising a plurality of elements. In one or more embodiments, the block size is determined according to configuration of the hardware running the recurrent neural network. For example, the block size may be associated to the data-path size, e.g. 8×8 or 16×16, of the processors. In order to prune blocks, a representing weight is picked (110) to represent an entire block. In one or more embodiments, the representing weight is the weight with maximum magnitude among all elements, average weight of all elements, or square average of all weights, etc. If the representing weight of one block is below a current threshold, all the weights in the block are set (115) to zeros.

Figure 2:
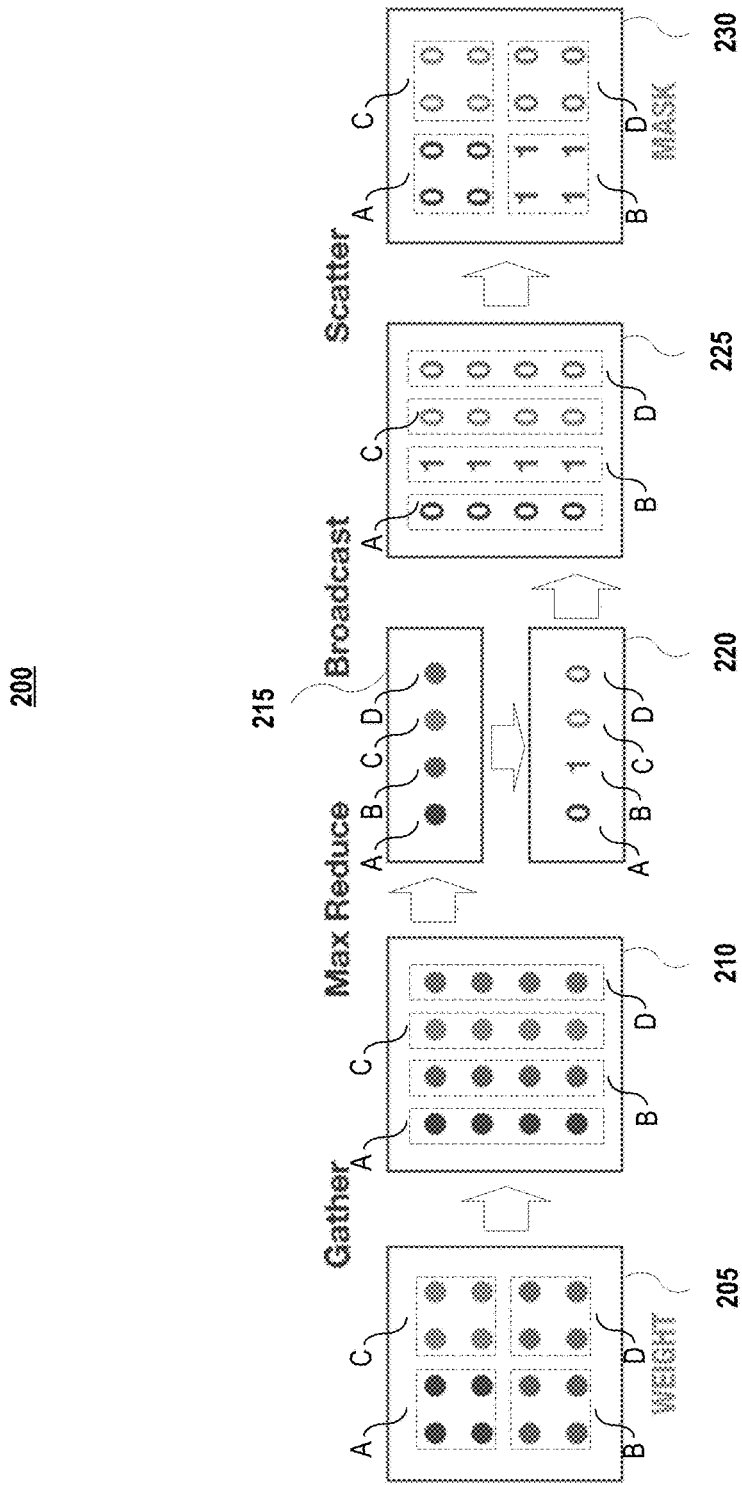
FIG. 2 depicts a methodology for generating block-sparse masks from a weight matrix, according to embodiments of the present document.

FIG. 2 depicts a methodology for generating block-sparse masks from a weight matrix for a given threshold, according to embodiments of the present document. The groups (A, B, C, and D) indicate blocks in a matrix, which, according to embodiments of the present disclosure, are transformed to produce a mask of 1's and 0's. The N-dimension weight matrix 205 is permutated in a gather step to obtain a permutated matrix 210, which is then collapsed from N-dimension into a one-dimension matrix 215 in a max reduce step. Based on comparison to a threshold, the one-dimension matrix 215 is transformed into the matrix 220 with elements in the matrix 215 replaced as 1 or 0. The matrix 220 is then unfolded into a matrix 225 in a broadcast step, which is the reverse of the max reduce step. Finally, the matrix 225 is scattered into the block-sparse mask 230 in a scatter step, which is the reverse of the gather step. The block-sparse mask is multiplied with the weights to generate a block-sparse weight matrix.

In one or more embodiments, the threshold (ϵ) is monotonically growing to cause more blocks to be pruned as training progress. In one or more embodiments, pruning more blocks stops when a threshold is reached, e.g., after around a predetermined percentage (such as 40%) of training epochs has completed. Any blocks that had been zeroed out are held at zero even after pruning has ended resulting in a sparse model at the end of training.

TABLE 1

Heuristics to pick hyper-parameters for block-pruning

| HYPER-PARAM | DESCRIPTION | HEURISTIC VALUES |
| --- | --- | --- |
| start_itr | Iteration to start pruning | Start of second epoch |
| ramp_itr | Iteration to increase the rate of pruning | Start of 20% of total epochs |
| end_itr | Iteration to stop pruning more parameters | Start of 40% of total epochs |
| start_slope (θ) | Initial rate of increasing the threshold | See Equation 2 |
| ramp_slope (ϕ) | Rate of increasing threshold after ramp iteration | 1.2θ to 1.7θ |
| freq | Number of iterations after which ϵ is updated | 100 |

Various hyper-parameters have been used to determine a threshold at a given iteration. Table 1 provides the description and heuristics (adapted for block pruning) for these hyper-parameters in one or more embodiments of the present invention disclosure. The start slope and ramp slope determine the rate at which the threshold increases. In order to determine start slope, weights from an existing dense model may be used. To achieve a desired, e.g. 90% sparsity, q may be assigned to the weight at a pre-determined percentile, e.g. 90%, of the absolute values in a weight matrix. To determine a threshold to prune individual weights, Equation 1 has been used to determine θ assuming ϕ is 1.5θ.

$$\theta = \frac{2 \times q \times freq}{2 \times (ramp_{itr} - start_{itr}) + 3 \times (end_{itr} - ramp_{itr})} \quad (1)$$

Figure 3:
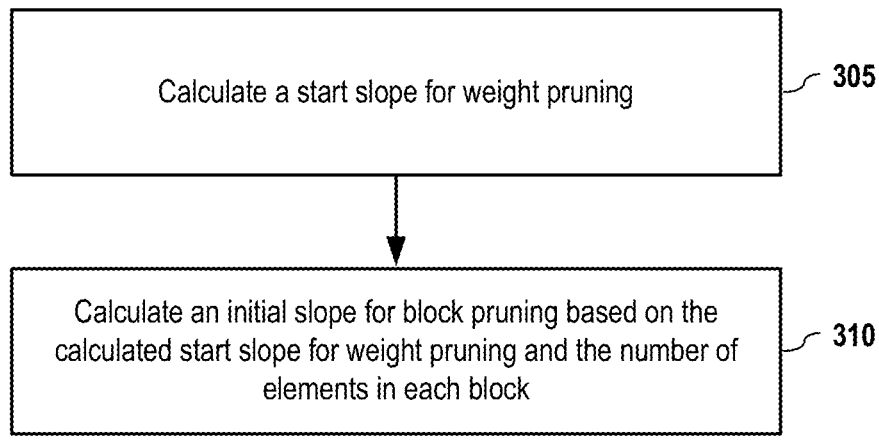
FIG. 3 depicts a process for determining one or more parameters for establishing block pruning threshold, according to embodiments of the present document.

In one or more embodiments, for block pruning instead of individual weight pruning, one or more parameters, such as start slope, are modified to take into account the number of elements in a block ($N_b$). FIG. 3 depicts a process for determining one or more parameters for establishing block pruning threshold, according to embodiments of the present document. In one or more embodiments, start slope is first calculated (305) for weight pruning ($\theta_w$) using the Equation 1. Given $\theta_w$, using Equation 2 is used to determine (310) the initial slope ($\theta_b$) for block pruning. Based on empirical results, it has been found that using this approach allows achieving block sparsity ranging from 85% to 95%. Further tuning of these hyper-parameters is required to achieve desired block sparsity.

$$\theta_b = \theta_w \times \sqrt[4]{N_b} \quad (2)$$

Figure 4:
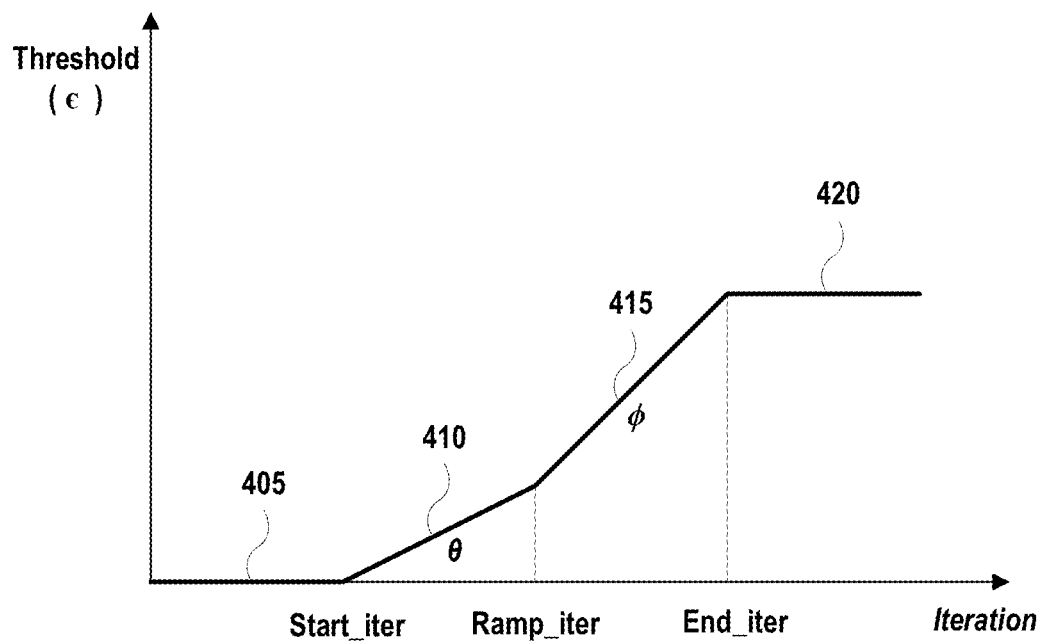
FIG. 4 depicts a threshold for implementing block pruning, according to embodiments of the present document.

In one or more embodiments, FIG. 4 depicts a threshold (∈) for implementing block pruning. The threshold (∈) is continuous and monotonically growing, comprising an initial section 405 with ∈ setting as zero for iterations below a start iteration number (Start_iter), a start section 410 with ∈ linearly increasing with a start slope θ for iterations between the start iteration number and a ramp iteration number (Ramp_iter), a ramp section 415 with ∈ linearly increasing with a ramp slope ϕ for iterations between the ramp iteration number and an end iteration number (End_iter). In one or more embodiments, the threshold (∈) may be kept constant in section 420 for iterations beyond the end iteration number. The start slope θ may be determined by aforementioned method using equations (1) and (2), and the ramp slope ϕ may be chosen as a multiple of the start slope θ, e.g. 1.5θ. The threshold is initially set as zero such that those important elements, some of which may be small initially, within a weight matrix have enough training epochs to progress (grow or diminish) before block pruning starts. In one or more embodiments, the start iteration number is set as a first predetermined percentage, e.g. 20%, of total training iterations. The ramp iteration number is set as a second predetermined percentage, e.g. 40%, of total training iterations.

In one or more embodiments, all the recurrent and fully connected layers in the network are pruned using the same block size. The pruning hyper-parameters are same for each type of layer in the network- recurrent weight layer and linear/fully connected layer.

2. Embodiments of Group LASSO Regularization

Figure 5:
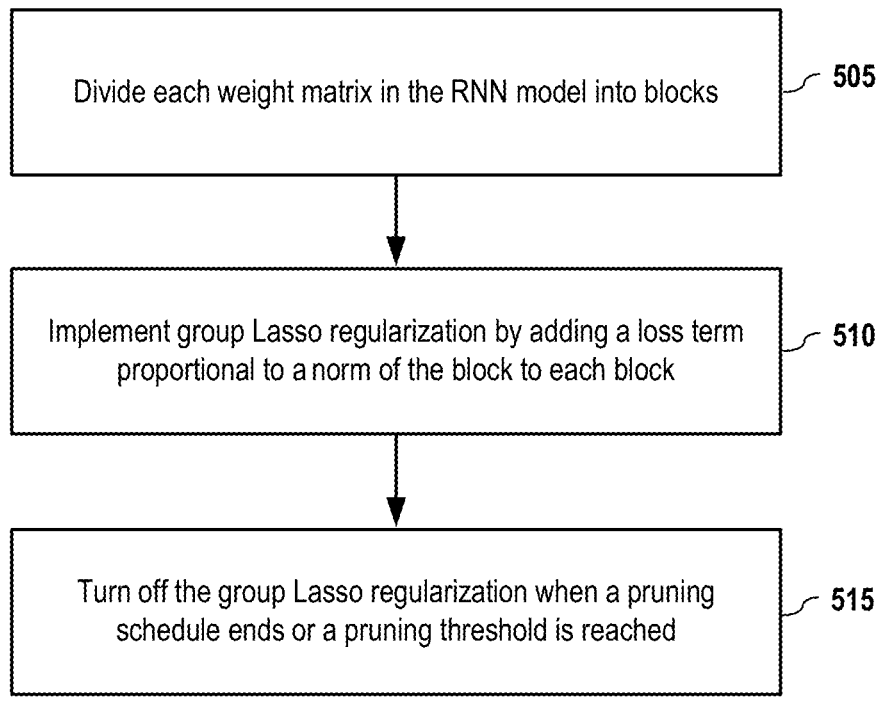
FIG. 5 depicts a process for group lasso regularization, according to embodiments of the present document.

Group lasso is a type of weight regularization that works on groups of weights and can zero out all the weights in a group. FIG. 5 depicts a process for group lasso regularization, according to embodiments of the current disclosure. In one or more embodiments, in order to induce block sparsity in the network, one or more weight matrices in the RNN model are divided (505) into blocks. For each block, a loss term proportional to a norm, such as the $\ell_2$ norm, of the block is add (510) to implement group Lasso regularization.

$$L = L_{training} + \lambda_g \Sigma_{g=1}^{G} \|w^{(g)}\|_2 \qquad (3)$$

where $w^{(g)}$ is a block of weights, $\|w^{(g)}\|_2$ is the $\ell$ norm of the block, and G is the total number of block. In one or more embodiments, the $\ell$ norm is a variant of the more general group lasso defined as $\|n\|_K = (n'Kn)^{1/2}$.

Group lasso has the property that a large enough $\lambda_g$ will drive all weights within certain groups to hard zeros. Thus, in one or more embodiments, group lasso regularization is explored to produce block-structured sparsity. In one or more embodiments, an appropriate constant $\lambda_g$ is chosen for the duration of training.

In one or more embodiments of weight regularization, less important weights are driven towards zero and more important weights retain large absolute values. In one or more embodiments, group lasso is combined with block pruning, such that group lasso guides the selection of blocks to prune. Group lasso regularization is applied to coincide with the pruning schedule. In one or more embodiments, regularization is turned off (515) when the pruning schedule ends or a pruning threshold is reached, which is typically after around 40% of training epochs. As discussed in Section C.1, weights that were already set to zero remain unchanged after this point. Group lasso is related to the well-known $\ell_1$ regularization. Exploration of $\ell_1$ regularization combined with weight pruning is discussed in Section G.

D. Various Experiments

It shall be noted that these experiments and results provided in this patent document are provided by way of illustration and were performed under specific conditions using a specific embodiment or embodiments; accordingly, neither these experiments nor their results shall be used to limit the scope of the disclosure of the current patent document.

Figure 6:
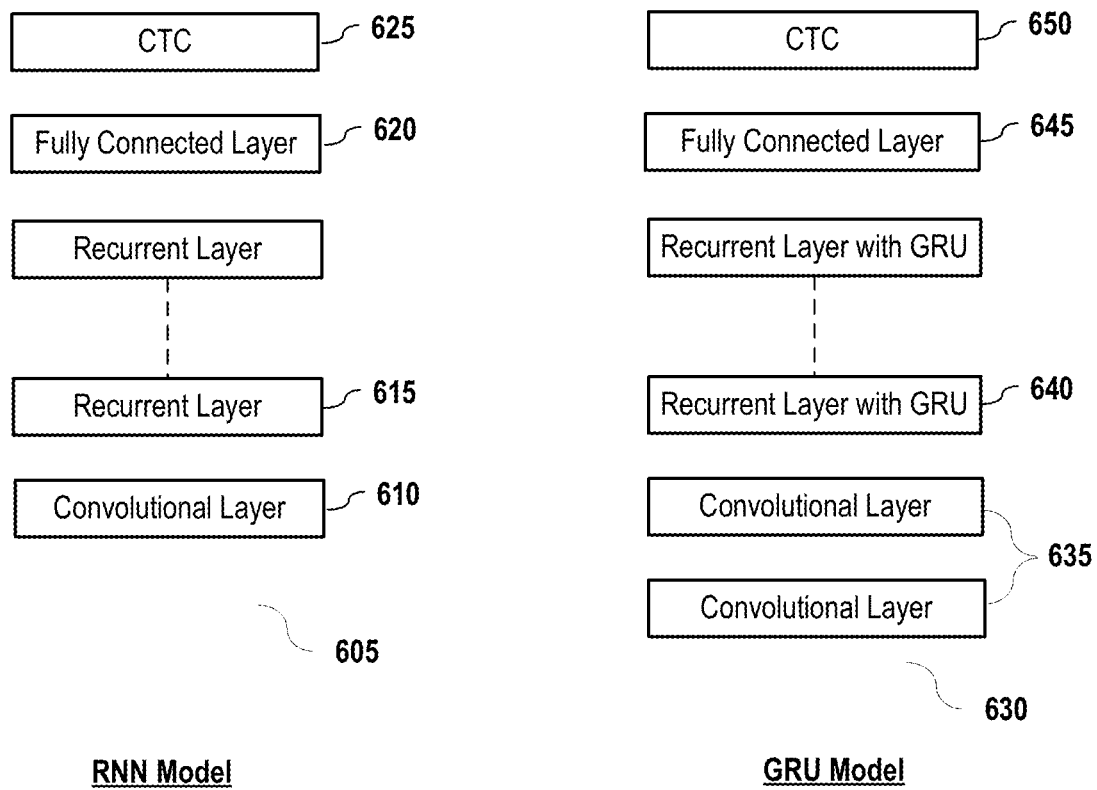
FIG. 6 depicts speech recognition models, including a RNN model and a GRU model, to run block sparsity experiments, according to embodiments of the present document.

FIG. 6 depicts speech recognition models, including a RNN model 605 and a GRU model 630, to run block sparsity experiments. In one or more embodiments, the RNN model 605 consists of a convolutional layer 610, followed by multiple, e.g. seven, bidirectional recurrent layers 615, a fully connected layer 620 and a Connectionist Temporal Classification (CTC) layer 625. The baseline RNN model (RNN Dense 1760) consists of 1760 hidden units in each recurrent layer with nearly 67 million parameters. The GRU model 630 consists of two convolutional layers 635, three recurrent layers 640 with GRU cells, a fully connected layer 645 and a CTC layer 650. The baseline GRU model (GRU Dense 2560) consists of 2560 hidden units in each layer with a total of 115 million parameters. The dataset used for training these models consists of 2100 hours of English speech. A validation set consisting of 3.46 hours of data was used. The Character Error Rate (CER) results are reported on an independent test set, consisting of 2.9 hours of English data.

In order to introduce block sparsity in RNNs, three different types of experiments, Block Pruning (BP), Group Lasso (GL), and Group Lasso with block pruning (GLP), were run. In one or more embodiments, weights were pruned in the recurrent layers (both linear and recurrent weights) and fully connected layers. Biases, batch-normalization parameters and weights in the convolutional and CTC layers are not pruned since they account for a small portion of the total weights in the network. Besides pruning hyper-parameters and $\lambda_g$, no other hyper-parameter changes were required for sparse training runs. The models are trained using Nesterov Stochastic Gradient Descent (SGD) with momentum. All models are trained for 25 epochs. The dense models are trained without any regularization.

Section D.1 shows results for different sparse models pruned with 4×4 blocks. Section D.2 compares the results for the two different group lasso experiments. Section D.3 discusses the impact of varying the block size on the accuracy of the model.

1. Block Sparsity Embodiments

In one or more embodiments, three types of experiments are conducted for both RNN and GRU models: pruning the baseline model, training smaller dense models, and pruning a model larger than the baseline model.

Initially, the baseline RNN and GRU models are pruned. Using BP and GLP, the parameter count for both these models are reduced by nearly 10×. As shown in Table 2, the sparse RNN model with 1760 hidden units has an overall block sparsity of 89% with a relative loss in accuracy of 16.7%. The sparse GRU model achieves slightly higher sparsity (90%) while losing only 8.8% of accuracy. This indicates that the block-sparse GRU model retains most of the capacity of the dense model.

TABLE 2

GRU and bidirectional RNN model results with 4 × 4 blocks

| MODEL | # PARAMS (in millions) | SPARSITY | CER | RELATIVE PERF | PRUNING ALGORITHM |
|---|---|---|---|---|---|
| RNN Dense 1760 | 67 | 0.0% | 15.36 | 0.0% | N/A |
| RNN Dense 704 | 11.6 | 0.0% | 18.95 | −23.4% | N/A |
| RNN Sparse 1760 | 7.3 | 89.2% | 17.93 | −16.7% | BP |
| RNN Sparse 2560 | 12.9 | 90.8% | 15.89 | −3.4% | GLP |
| RNN Sparse 3072 | 25.8 | 87.3% | 15.66 | −1.9% | BP |
| GRU Dense 2560 | 115 | 0.0% | 15.42 | 0.0% | N/A |
| GRU Dense 704 | 11.0 | 0.0% | 21.26 | −37.9% | N/A |
| GRU Sparse 2560 | 10.8 | 90.6% | 16.78 | −8.8% | GLP |
| GRU Sparse 3584 | 25.6 | 88.4% | 16.23 | −5.2% | BP |

Secondly, dense models are trained with fewer parameters to determine if sparsity is reducing overfitting in the large dense baseline models. For both RNN and GRU models, a dense model with 704 hidden units in each layer is trained, resulting in approximately the same number of parameters as the final sparse models. Table 2 shows that these dense models perform worse than the sparse models for both RNN and GRU models. Large sparse models are a better approach to reduce parameter count than dense small models.

Finally, sparse models with more hidden units in each recurrent layers are trained to recover the accuracy. For RNN models, the hidden layer size is increased to 2560 and 3072. As shown in Table 2, the RNN sparse 3072 is only 1.9% worse than the dense baseline model. The 2560 and 3072 sparse RNN models reduce the overall parameter count by 5× and 2.5× respectively. Similarly, pruning the GRU model with 3584 hidden nodes reduces the accuracy loss to about 5% while still shrinking the model by 4.5×.

Evaluation show that inducing block sparsity in the baseline model allows the model size to be reduced by approximately 10× with a small loss in accuracy. Pruning a model larger than the baseline model allows to reduce the accuracy loss while reducing model size by nearly 5×. In the invention document, results also indicate that large sparse models result in better accuracy than small dense models.

2. Group Lasso Variants

Table 3 highlights the results of GL and GLP experiments for two different models. For both RNN models with 1760 and 2560 hidden nodes, group lasso without any pruning does significantly worse than combining group lasso with the block pruning methodology.

TABLE 3

Group lasso experiments for RNN models with 4 × 4 blocks

| MODEL | # PARAMS (in millions) | SPAR-SITY | CER | RELA-TIVE PERF | PRUNING ALGO-RITHM |
|---|---|---|---|---|---|
| RNN Sparse 1760 | 10.9 | 83.3% | 30.14 | −96% | GL |
| RNN Sparse 1760 | 6.2 | 90.8% | 19.24 | −25.3% | GLP |
| RNN Sparse 2560 | 24.4 | 82.8% | 27.4 | −78.4% | GL |
| RNN Sparse 2560 | 12.9 | 90.8% | 15.89 | −3.4% | GLP |

TABLE 4

GRU and bidirectional RNN results for different block sizes using B

| MODEL | BLOCK SIZE | # PARAMS (in millions) | SPARSITY | CER | RELATIVE PERF |
|---|---|---|---|---|---|
| RNN Sparse | 1 × 1 | 7.3 | 89.2% | 17.32 | −12.8% |
| RNN Sparse | 4 × 4 | 7.3 | 89.2% | 17.93 | −16.7% |
| RNN Sparse | 12 × 2 | 10.8 | 84.1% | 16.96 | −9.99% |
| RNN Sparse | 8 × 8 | 10.7 | 84.1% | 17.66 | −14.9% |
| RNN Sparse | 16 × 16 | 11.1 | 83.6% | 17.1 | −11.3% |
| RNN Sparse | 32 × 32 | 14.1 | 79.1% | 16.67 | −8.5% |
| GRU Sparse | 1 × 1 | 13.1 | 88.7% | 16.55 | −7.3% |
| GRU Sparse | 4 × 4 | 16.2 | 86.0% | 16.97 | −10.5% |
| GRU Sparse | 16 × 16 | 20.8 | 81.9% | 16.84 | −9.2% |

In one or more embodiments, in order to achieve high sparsity (80% or higher), $\lambda_g$ is set to a relatively high value. For instance, experiments using GL required $\lambda_g$ approximately 3× larger than the GLP experiments. This high regularization factor hurts the model accuracy. The dense baseline model is trained without any regularization. Even without regularization, the dense model does not overfit the training dataset. Group lasso experiments underfit the training data due to the high value of $\lambda_g$. Group lasso may be more successful in inducing sparsity where the dense model overfits the training dataset. In the GLP experiments, the regularization factor may be reduced since pruning forces smaller magnitude weights to zero. This combined approach results in improved accuracy while maintaining high levels of sparsity.

3. Block Size Variation

Table 4 shows the results of varying block size for pruning for RNN and GRU baseline models. Increasing the block size to 16×16 and 32×32 requires reducing the sparsity to 83.6% and 79.1% respectively for RNN models to obtain good accuracy. Similar results hold true for the GRU model as well. Large sparse blocks reduce memory overhead for storing non zero values and can take advantage of array data-paths in more modern processors. Therefore, even though large blocks achieve lower sparsity, they result in lower memory and compute requirements.

E. Performance

The primary advantage of a block-sparse format is to increase hardware efficiency by making the computation more regular. Sparse formats incur at least three types of overhead: i) indexing overhead, ii) irregular memory accesses, and iii) incompatibility with array-data-paths, all of which are mitigated by using larger block sizes.

Indexing Overheads. Sparse formats use extra memory to track the location of each non-zero value. For example, the compressed-sparse-row (CSR) format uses approximately two extra index values for each non-zero value. The size of these extra index values depends on the maximum matrix size. Using 16-bit indices incurs 32-bits of overhead per non-zero value and allows up to 64 k×64 k matrices to be supported. Assuming that neural network weights are represented with 16-bits, this is a 200% overhead. Block sparsity reduces this overhead by a factor of the block size because the index is shared over the entire block. For example, using a block size of 4×4 reduces the memory bloat to 12.5%, and using a block size of 16×16 reduces the overhead to less than 1%.

Irregular Memory Accesses. Caches lines, DRAM row buffers, and TLBs provide the best performance when memory is accessed in relatively large contiguous units (e.g. 64 bytes for cache lines, 4 KB for a DRAM row) as opposed to in fine-grained random accesses. Block-sparse formats store blocks contiguously in memory, resulting in large coalesced accesses.

Array Data-Paths. Fine-grained sparsity cannot directly take advantage of array-data-paths, such as the 16×16 TensorCore units in the Volta GPU by NVIDIA or the 256×256 units in the Google TPU. There are significant advantages of using these units, for example, on the Volta V100 GPU, they enable up to 8× higher throughput than the SIMD data-paths. In order to keep these units busy, the block size should be at least as large as the hardware data-path size (i.e. 16×16 or greater on V100).

Figure 7A:
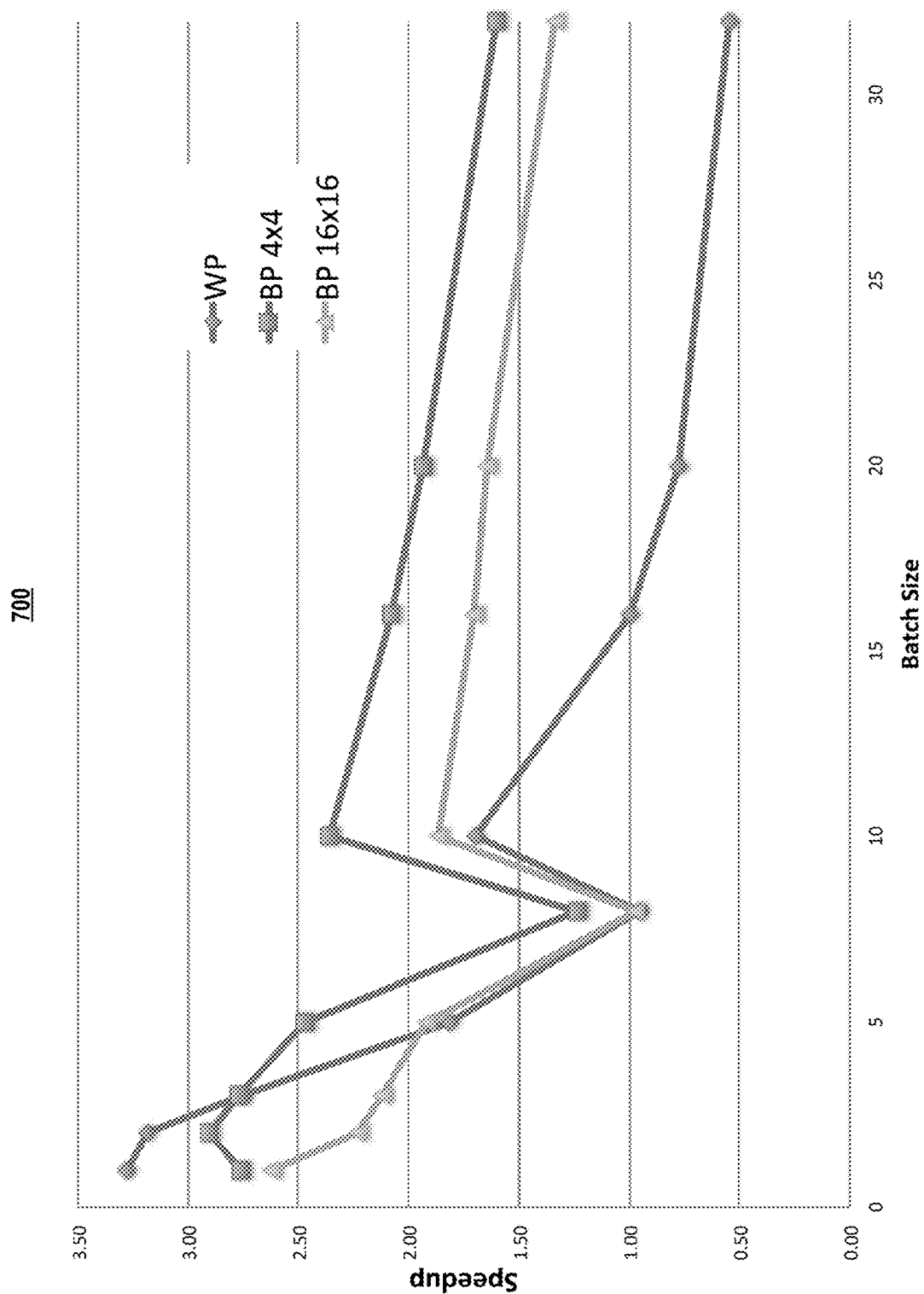
FIG. 7A and FIG. 7B depict block-sparse matrices for RNN layers and GRU layers, respectively, achieving higher speed-up than unstructured sparsity for large batch sizes, according to embodiments of the present document.
Figure 7B:
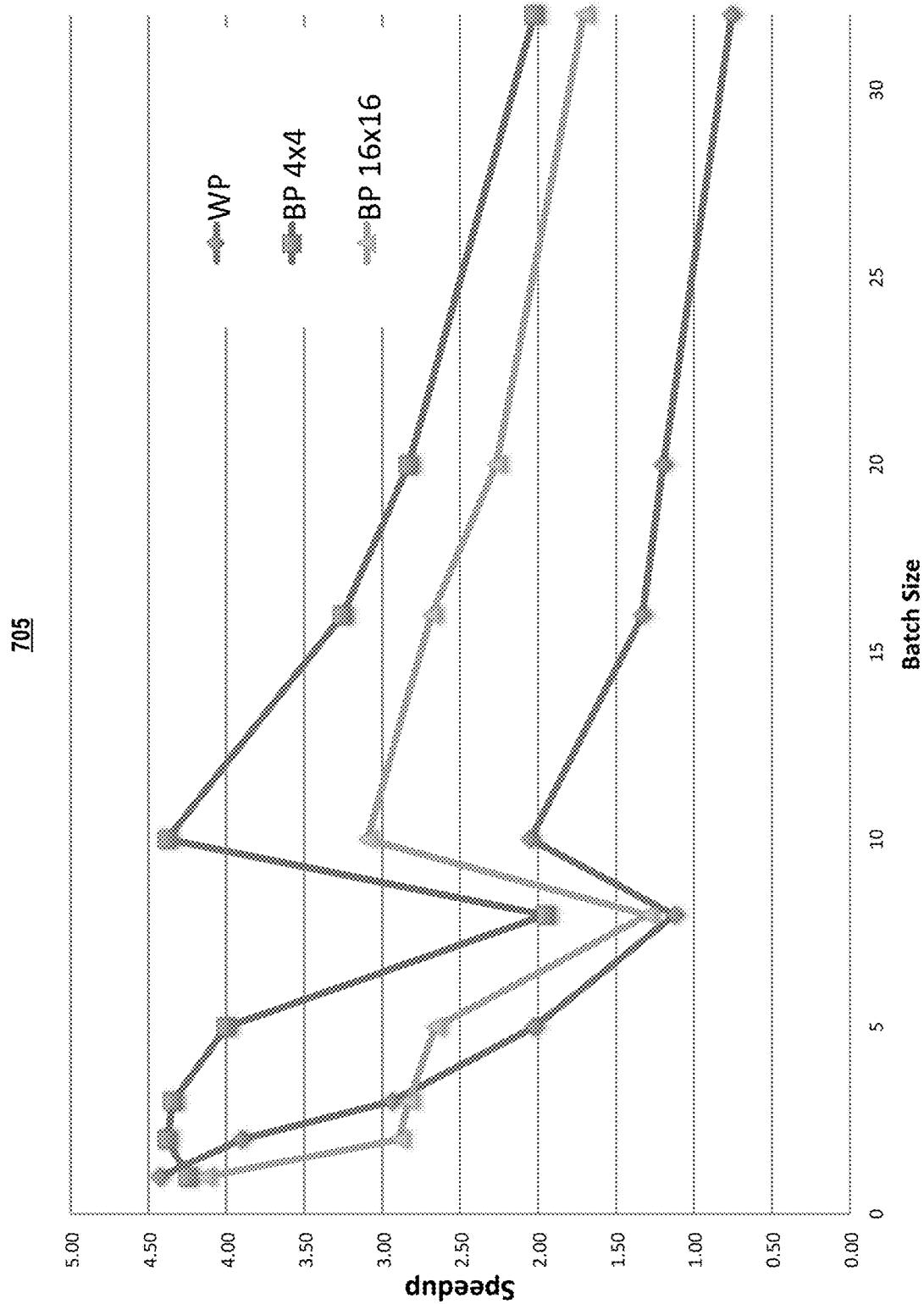

FIG. 7A and FIG. 7B show that block-sparse matrices achieve higher speed-up than unstructured sparsity for large batch sizes. Specifically, FIG. 7A shows speed-up for RNN 1760 layer matrix multiply and FIG. 7B shows speed-up for GRU 2560 layer matrix multiply. In FIG. 7A and FIG. 7B, the speed-up is achieved due to reducing irregular memory accesses and improving load balance. 4×4 blocks have higher speed-up than 16×16 blocks. Benchmarks are run on TitanX Maxwell using the CuSparse library. Sparse matrices are represented in the CSR format. RNN matrix sizes are (1760, 1760) with 90% sparsity and (1760, batch size). GRU matrix sizes are (7680, 2560) with 95% sparsity and (2560, batch size). Results are shown for matrices from Weight Pruning (WP) and Block Pruning (BP).

F. Some Discussions

1. Pruning Characteristics

Figure 8A:
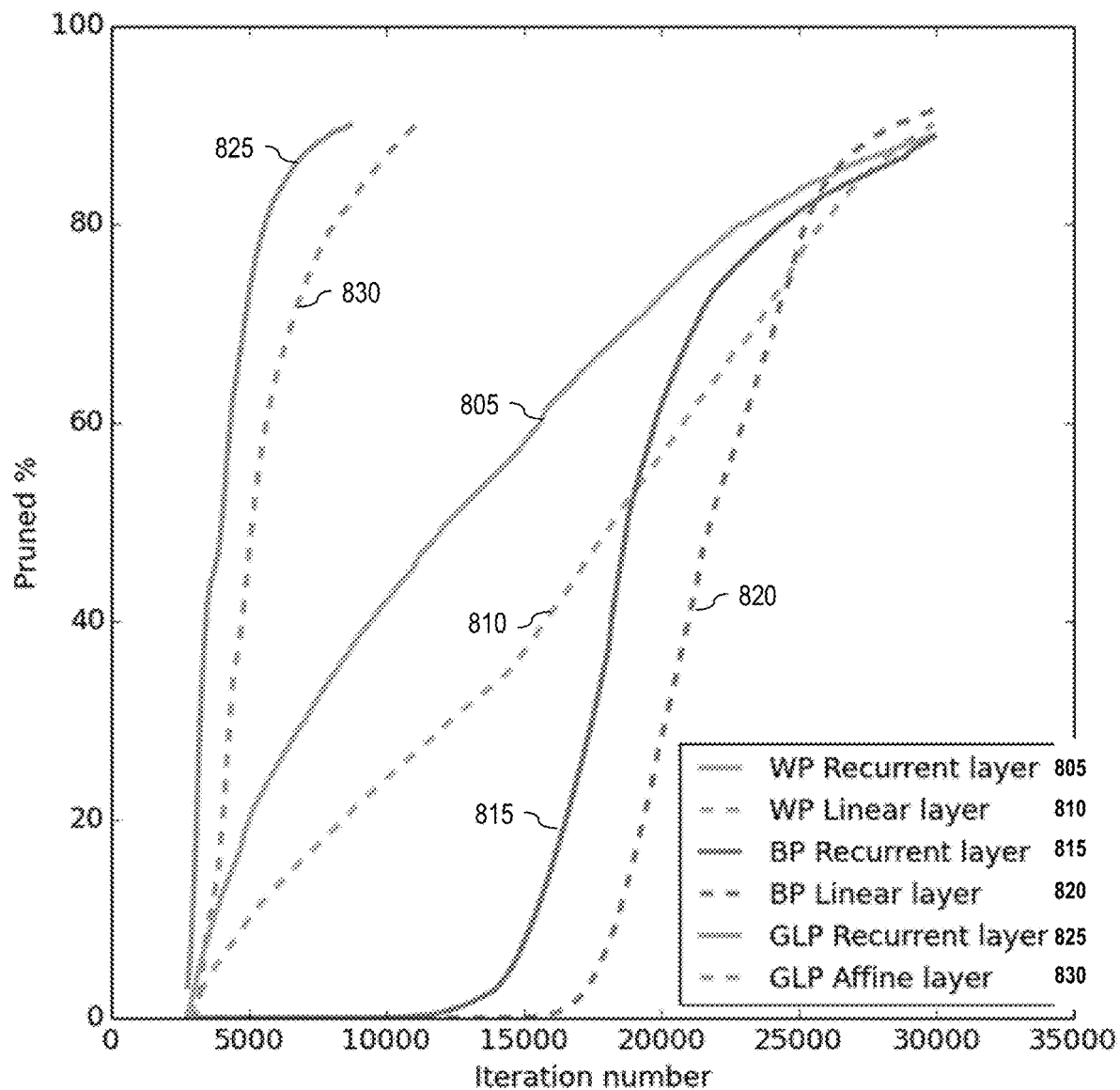
FIG. 8A depicts pruning schedules for two layers in the network for WP, GLP and BP models, according to embodiments of the present document.

FIG. 8A plots various pruning schedules of a recurrent and linear layer of the bidirectional model trained with BP and Weight Pruning (WP). For all three algorithms, pruning begins just after the first epoch at 2700 iterations. Curves 805, 810, 815, 820, 825, and 830 correspond to WP recurrent layer, WP linear layer, BP recurrent layer, BP linear layer, GLP recurrent layer, and GLP affine layer respectively. The BP and GLP models result in a sharper curve with more weights being set to zero in a short span of iterations. In these experiments, the max function is used to reduce the blocks to a single value which may be the cause of the sharpness in pruning. Also the GLP model reaches 90% sparsity just before 10,000 iterations which is significantly earlier than the BP model. GLP training encourages sparsity early on in the training run by pushing the blocks of weights towards zero.

Figure 8B:
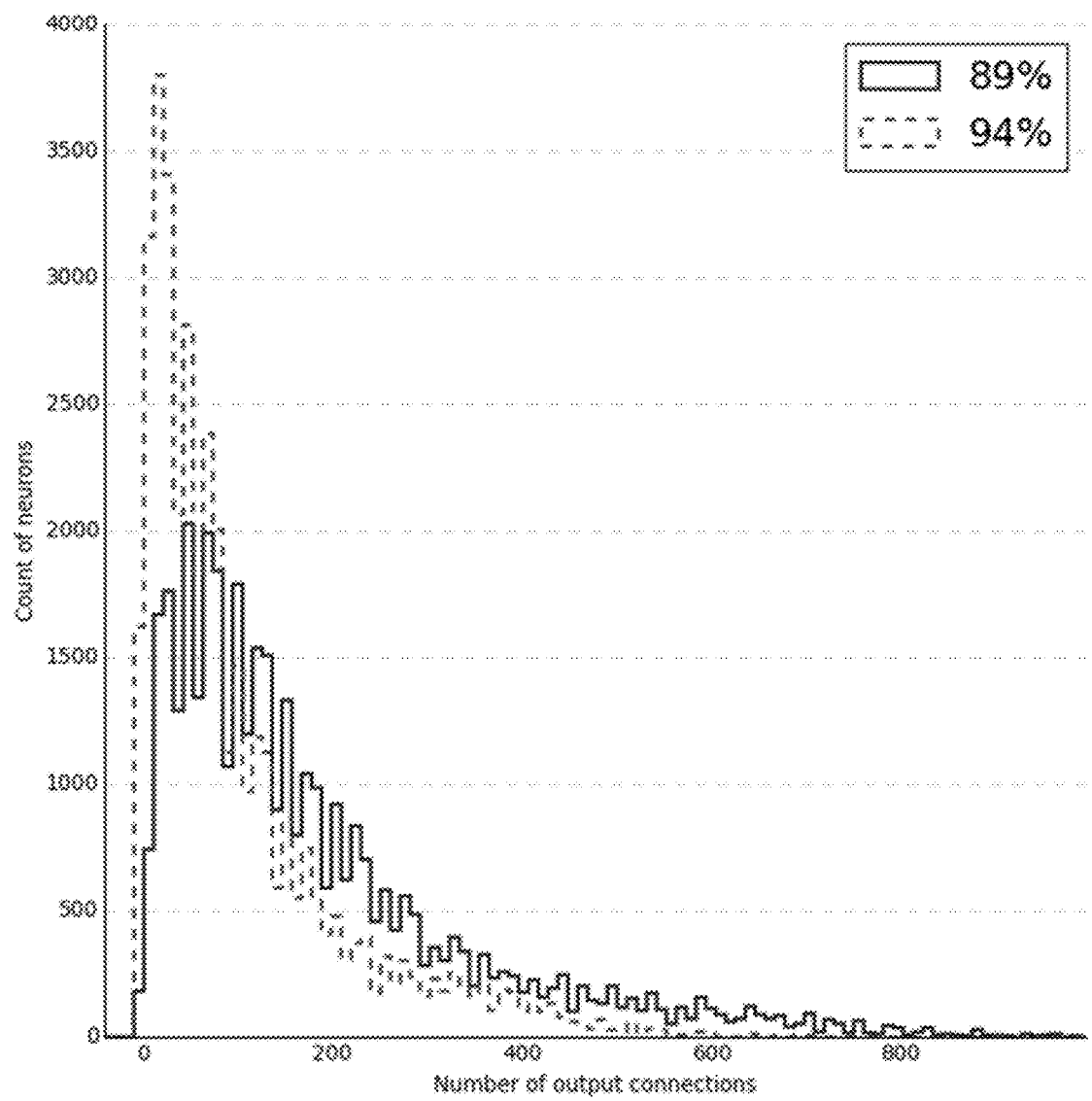
FIG. 8B depicts histograms of the number of output connections for all neurons in a network using block pruning with 4×4 blocks, according to embodiments of the present document.

FIG. 8B shows the histogram of the number of output connections for all the neurons in a network for two models with different sparsity pruned with BP. The 94% sparse model does significantly worse than the 89% sparse. For the model with 89% sparsity, only 180 neurons have all their output weights set to zero out of a total of 38270. This model produced good accuracy relative to the dense baseline. However, increasing the sparsity to 94% for the layer results in 1620 neurons having all zero output weights. Additionally, a lot more neurons have a smaller number of non-zero output weights.

2. Impact of Sparsity on Accuracy

Figure 9A:
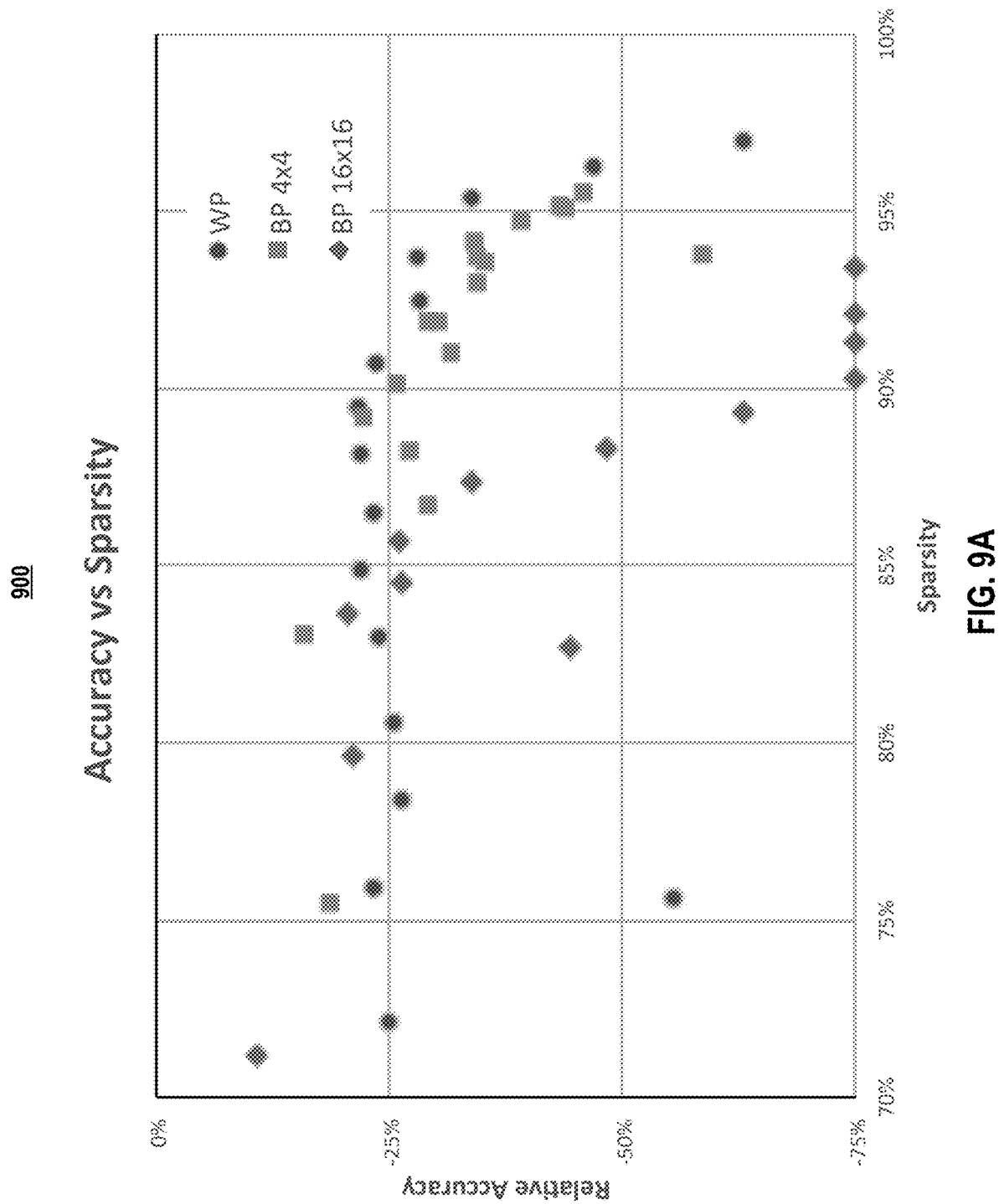
FIG. 9A depicts relative accuracy for different block sizes (4×4, 16×16) and WP for varying sparsity on a RNN model, according to embodiments of the present document.

In one or more embodiments, using a baseline RNN model, many weight and block pruning experiments, with varying hyper-parameters, were run to produce a spectrum of results ranging from 70% to 97% sparsity. For these experiments, the models are trained for 20 epochs and the accuracy is measured on the validation set instead of the test set. Therefore, the relative accuracy for these models is slightly different from the results reported in Section D.1. FIG. 9A shows relative accuracy for different block sizes (4×4, 16×16) and WP for varying sparsity on the RNN 1760 model. Any models with relative accuracy worse than −75% are capped at 75%. As shown in FIG. 9A, models pruned using WP with sparsity less than 95% have relative accuracy ranging from −20% to −27%. Increasing the sparsity for the model beyond 95% results in 30% or more accuracy loss. This accuracy "cliff" is earlier for models pruned with block sparsity. For block size 4×4, models with sparsity greater 90% yield a relative accuracy loss of 30% or higher. Similarly, for blocks of 16×16, models with sparsity greater than 86% have 30% or more accuracy loss. A similar trend is observed for block size 32×32. This indicates that there is a tradeoff between sparsity, block size and accuracy of the model.

3. Sparsity vs Layers

Figure 9B:
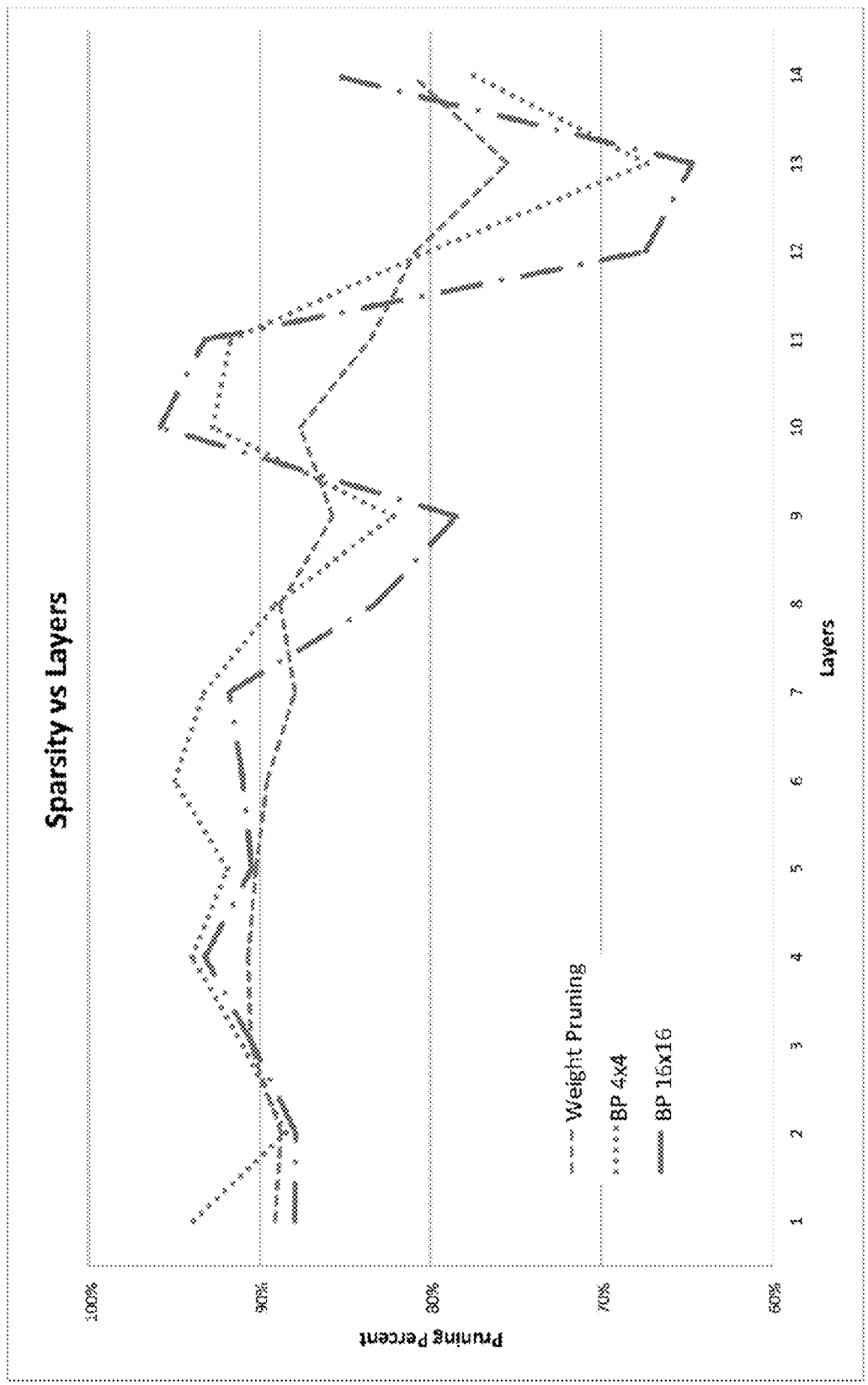
FIG. 9B depicts sparsity of all recurrent layers in a network using Weight Pruning (WP) and Block Pruning (BP), according to embodiments of the present document.

FIG. 9B shows sparsity of different recurrent layers in the network in the RNN model, pruned using BP and WP. All recurrent layers have the same pruning hyper-parameters. Layer 1 is the first recurrent layer and layer 14 is the final recurrent layer before the CTC cost layer. For both block pruning and weight pruning, it can be seen that the initial layers are pruned more aggressively compared to the final layers. Increasing sparsity in the layers closer to the output results in poor accuracy. Additionally, the variance in sparsity across the layers increases with the block size. This increasing variance makes it harder to increase the block size beyond 32×32 with the same pruning hyper-parameters for all recurrent layers.

G. $\ell_1$ and $\ell_{1/2}$ Regularization Embodiments

In one or more embodiments, besides group lasso regularization, $\ell_1$ and $\ell_{1/2}$ regularizers were considered to induce sparsity in the network. These regularizers act on individual weights and could aid in inducing unstructured sparsity in the network. $\ell_1$ regularization is defined as:

$$L = L_{training} + \lambda \Sigma_{i=1}^{k} |w_i| \quad (4)$$

where $|w_i|$ is the absolute value of a weight and k is the total number of weights. Note the gradient expression for each weight $w_j$:

$$\frac{\partial}{\partial w_j} \sum_{i=1}^{k} |w_i| = \text{sgn}(w_j) \quad (5)$$

As with the group lasso experiments described in section C.2, $\ell_1$ regularization is explored with and without pruning. Weight pruning (WP) algorithm is used along with regularization. The motivation is the same as group lasso block sparsity experiments: either to guide pruning or to produce sparsity directly.

In one or more embodiments, $\ell_{1/2}$ regularization is defined as:

$$L = L_{training} + \lambda \Sigma_{i=1}^{k} |w_i|^{1/2} \quad (6)$$

For $\ell_{1/2}$ regularization used to produce sparsity directly, the gradient for $\ell_{1/2}$ regularization is $1/2|w_i|^{-1/2}$. This term is smaller for weights with larger magnitude. It is expected that $\ell_{1/2}$ will drive unimportant weights towards zero while leaving large weights relatively unaffected, thus avoiding the accuracy loss associated with excessive regularization.

In one or more embodiments, for $\ell_1$ and $\ell_{1/2}$ experiments in this invention document, the Deep Speech 2 Bidirectional RNN baseline model described in Section D is used. These models are trained for 25 epochs on an internal training dataset of 2000 hours. The results are reported on an independent test set consisting of 2.9 hours.

TABLE 5

$\ell_1$ and $\ell_{1/2}$ results with the bidirectional RNN model with 1760 hidden units

| MODEL | # PARAMS (in millions) | SPAR-SITY | CER | RELA-TIVE PERF | PRUNING ALGO-RITHM |
|---|---|---|---|---|---|
| RNN Dense | 67 | 0.0% | 15.36 | 0.0% | N/A |
| RNN Sparse | 7.3 | 89.2% | 17.32 | −12.8% | Weight pruning |
| RNN Sparse | 11.2 | 83.6% | 24.8 | −61.5% | $\ell_1$ |
| RNN Sparse | 7.4 | 89.1% | 17.28 | −12.5% | $\ell_1$ with pruning |
| RNN Sparse | 6.6 | 90.3% | 18.50 | −20.4% | $\ell_{1/2}$ with pruning |

As shown in Table 5, without pruning, $\ell_1$ model results in significantly worse accuracy compared to the dense baseline. Combining $\ell_1$ with weight pruning allows recovering the loss in accuracy with similar sparsity. The $\ell_{1/2}$ with pruning model performs worse than the $\ell_1$ with pruning model. Comparing the two regularizers, this result indicates that $\ell_1$ is better at guiding pruning than $\ell_{1/2}$, more suitable as a regularizer, or both.

Similar to group lasso experiments, $\ell_1$ regularization experiments require a significantly higher λ to achieve high sparsity without any pruning. It is suspected that these regularizers would be more successful in inducing sparsity for models that overfit the training dataset.

H. Some Conclusions

It is demonstrated that using block pruning and group lasso combined with pruning during training, block-sparse RNNs may be built as accurate as the dense baseline models. The block-sparse models have significantly fewer parameters than the dense baselines reducing memory requirements. Block-sparse models may take advantage of the underlying hardware efficiently.

I. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
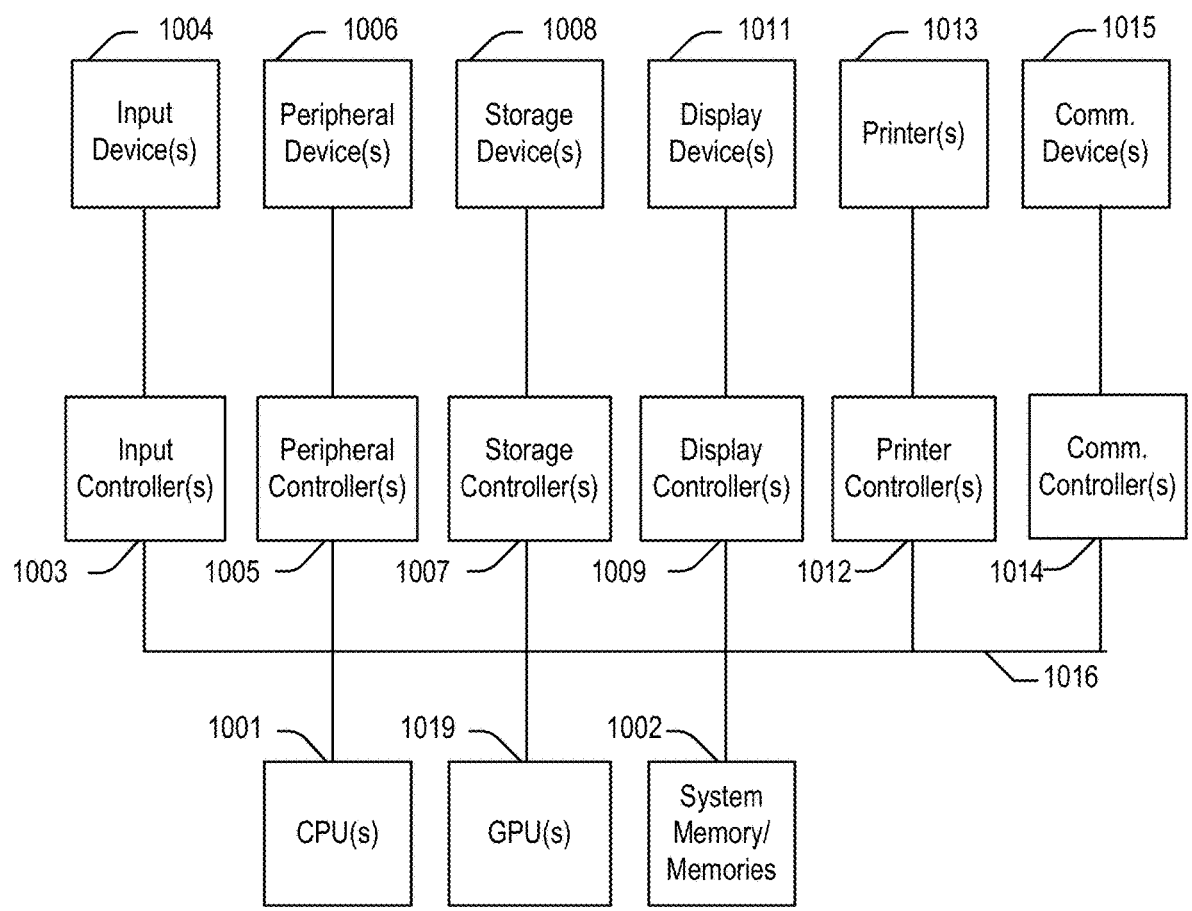
FIG. 10 depicts a simplified block diagram of a computing device/information handling system, in accordance with embodiments of the present document.

FIG. 10 depicts a simplified block diagram of a computing device/information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for computer learning, the method comprising:
   dividing at least one weight matrix of a neural network model into a plurality of blocks with each block comprising a plurality of elements, the block comprising a block size associated with data-path size of one or more processors running the neural network model; and
   pruning a neural network model in a training process to reduce parameter numbers of the neural network model for reduced memory and computation requirements, pruning the neural network model comprising at least one from the following steps:
      applying block pruning by setting all weights in a block to zeros in response to a representative weight representing the block being below a threshold; or
      applying a group lasso regularization for each block by adding a loss term proportional to $\ell_2$ norm of the block to drive one or more blocks towards zeros.

2. The computer-implemented method of claim 1 wherein the threshold is initially set as zero for an initial training iteration or iterations to allow the weights in the at least one weight matrix to progress.

3. The computer-implemented method of claim 2 wherein the threshold has a start slope starting at a start iteration after the initial training iteration or iterations.

4. The computer-implemented method of claim 3 the start slope is determined by one or more hyper-parameters including the number of elements in each block.

5. The computer-implemented method of claim 3 wherein the at least one weight matrix comprises one or more recurrent weight matrices for one or more recurrent layers within the neural network model, and one or more non-recurrent weight matrices for one or more fully connected layer within the neural network model, and wherein one or more hyper-parameters are the same for each type of weight matrices.

6. The computer-implemented method of claim 3 wherein the threshold has a ramp slope starting at a ramp iteration, which occurs after the start iteration.

7. The computer-implemented method of claim 6 wherein the ramp slope is a multiple of the start slope.

8. The computer-implemented method of claim 1 wherein the proportion to the $\ell_2$ norm of the block is constant during the training process.

9. The computer-implemented method of claim 1 wherein the group lasso regularization is applied in combination with block pruning.

10. A system for computer learning, the system comprising:
    a neural network model to implement one or more computer learning tasks, the neural network model network comprises one or more recurrent layers and one or more non-recurrent layers; and
    one or more processors configured to train the neural network model in a training process to reduce parameter numbers of the neural network model for reduced memory and computation requirements, the training process comprising:
       dividing at least one weight matrix of the neural network model into a plurality of blocks of a same block size with each block comprising a plurality of elements, the block size is associated with structure of the one or more processors running the neural network model;
       pruning the neural network model by at least one of the following:
          applying block pruning by setting all weights in a block to zeros in response to a representative weight representing the block being below a threshold; or
          applying a weight regularization for each block by adding a loss term proportional to a norm of the block to drive one or more blocks towards zeros; and
       stopping pruning the neural network model when a desired percentage of block sparsity or a predetermined percentage of a total training iterations is reached.

11. The system of claim 10 wherein the norm of the block is a $\ell_2$ norm of the block, the weight regularization is a group lasso regularization.

12. The system of claim 11 wherein the proportion to the $\ell_2$ norm of the block is constant during the training of the neural network model.

13. The system of claim 10 wherein the threshold is initially set as zero for an initial set of one or more training iterations to allow weights in the at least one weight matrix to progress, the threshold then monotonically grows to prune the at least one weight matrix.

14. The system of claim 13 wherein the threshold monotonically grows with a slope associated with the block size.

15. A non-transitory computer-readable medium or media comprising one or more sequences of instructions which, when executed by one or more processors, causes the steps to be performed comprising:
    dividing each of a plurality of weight matrices in a neural network model into a plurality of blocks with each block comprising a plurality of elements and comprising a block size that is associated with data-path size of one or more processors running the neural network model; and
    pruning the neural network model to reduce parameter numbers of the neural network model for reduced memory and computation requirements by implementing at least one of the following:
       applying block pruning by setting all weights in a block to zeros in response to a representative weight representing the block being below a threshold; or applying a weight regularization for each block by adding a loss term proportional to a norm of the block to drive one or more blocks towards zeros.

16. The non-transitory computer-readable medium or media of claim 15 wherein the threshold is initially set as zero for an initial training iteration or training iterations to allow weights in at least one weight matrix to grow, the threshold then monotonically grows to prune the at least one weight matrix.

17. The non-transitory computer-readable medium or media of claim 16 wherein the threshold monotonically grows with a slope associated with the block size.

18. The non-transitory computer-readable medium or media of claim 15 wherein the norm of the block is a $\ell_2$ norm of the block, and wherein the weight regularization is a group lasso regularization.

19. The non-transitory computer-readable medium or media of claim 18 wherein the group lasso regularization is applied in combination with block pruning.

20. The non-transitory computer-readable medium or media of claim 15 wherein the steps further comprising:
stopping pruning the neural network model when a desired percentage of block sparsity or a percentage of total training iterations is reached.

* * * * *